United States Patent
Lumley et al.

[15] 3,700,850
[45] Oct. 24, 1972

[54] METHOD FOR DETECTING THE AMOUNT OF MATERIAL REMOVED BY A LASER

[72] Inventors: Robert Miller Lumley, Trenton; Victor John Tarassov, Princeton, both of N.J.

[73] Assignee: Western Electric Company, Incorporated, New York, N.Y.

[22] Filed: Sept. 4, 1970

[21] Appl. No.: 69,851

[52] U.S. Cl. .......................219/121 LM, 219/121 EM
[51] Int. Cl. ..............................................B23k 27/00
[58] Field of Search ..............219/121 L, 121 EB, 69; 29/421 E

[56] References Cited

UNITED STATES PATENTS 3,542,995    11/1970    Boone et al.................219/121

*Primary Examiner*—J. V. Truhe
*Assistant Examiner*—George A. Montanye
*Attorney*—W. M. Kain, R. P. Miller and R. C. Winter

[57] ABSTRACT

A pulsed or Q-switched laser removes material from a workpiece during a numerically-controlled machining process. The amount of material removed after each laser pulse is monitored by measuring the time taken for the shock waves generated by the laser pulse to traverse the remaining portion of the workpiece.

19 Claims, 5 Drawing Figures

INVENTORS
R. M. LUMLEY
V. J. TARASSOV
By B. W. Sheffield
ATTORNEY

PATENTED OCT 24 1972 3,700,850

METHOD FOR DETECTING THE AMOUNT OF MATERIAL REMOVED BY A LASER

BACKGROUND OF THE INVENTION

Broadly speaking, this invention relates to methods and apparatus for machining workpieces. More particularly, in a preferred embodiment, this invention relates to methods and apparatus for machining workpieces in which a beam of radiant energy is used to obtain the necessary material removal from the workpiece.

In the machining of workpieces, the use of a beam of radiant energy, for example, a beam of light, from a pulsed, Q-switched or C.W. laser, offers several advantages over more conventional machining techniques. One of these advantages stems from the fact that the radiant energy beam can be focused to an extremely fine point and, thus, the machining of the workpiece can be done to a much higher degree of accuracy than is possible by the use of a rotating drill bit or other mechanical device.

Because of the relatively low power density which can be obtained from a C.W. laser, pulsed or Q-switched lasers are preferred for the machining of workpieces. Such lasers apply a series of intermittent bursts of radiant energy to the workpiece to be machined.

The use of intermittently applied radiant energy suffers, however, from the disadvantage that the energy contained in the beam varies with each successive application and this variation is inherent at the present state of the art. Since the amount of material removed from the workpiece is directly proportional to the energy content of the beam, this means that different time intervals may be required to remove a given amount of material from adjacent areas of the same workpiece. This problem is even more troublesome when it is desired to employ radiant energy machining in conjunction with a numerically-controlled machine for displacing the workpiece relative to the beam. This is due to the fact that heretofore the program controlling the numerically controlled machine has no way of determining how much material the radiant energy beam has removed after each intermittent application; and, accordingly, although numerically-controlled machines can be stepped through their program steps very accurately, variations in the energy content of the beam frequently results in improperly machined workpieces.

The problem, then, is to find a technique for machining a workpiece with a beam of radiant energy which includes a highly accurate method for determining when the desired amount of material has been removed from the workpiece, but which method does not interfere with the accuracy and precision obtainable by the use of the radiant energy beam.

This problem has been solved by the instant invention which, in one embodiment, comprises a method for removing a predetermined amount of material from a workpiece comprising the steps of: applying a beam of radiant energy to said workpiece to effect material removal therefrom, the impingement of said beam generating an acoustical shock wave in said workpiece; measuring the time interval required for said shock wave to traverse said workpiece from the point of impact of said beam to a sensor positioned proximate said workpiece; and repeating the application of said beam to said workpiece until said time interval corresponds to some predetermined value indicative of the fact that said predetermined amount of material has been removed from said workpiece.

One illustrative apparatus for practicing the above method comprises: a source of radiant energy, means for supporting said workpiece proximate said source of radiant energy, a sensor located proximate a first surface of said workpiece to detect the arrival of acoustical shock waves generated in said workpiece by the impact of said radiant energy on a second surface of said workpiece, and means responsive to the time interval required for said shock waves to traverse said workpiece for terminating the application of said radiant energy to said workpiece.

The invention and its mode of operation will be more fully understood from the following detailed description and the drawings.

DETAILED DESCRIPTION OF THE INVENTION

Figure 1:
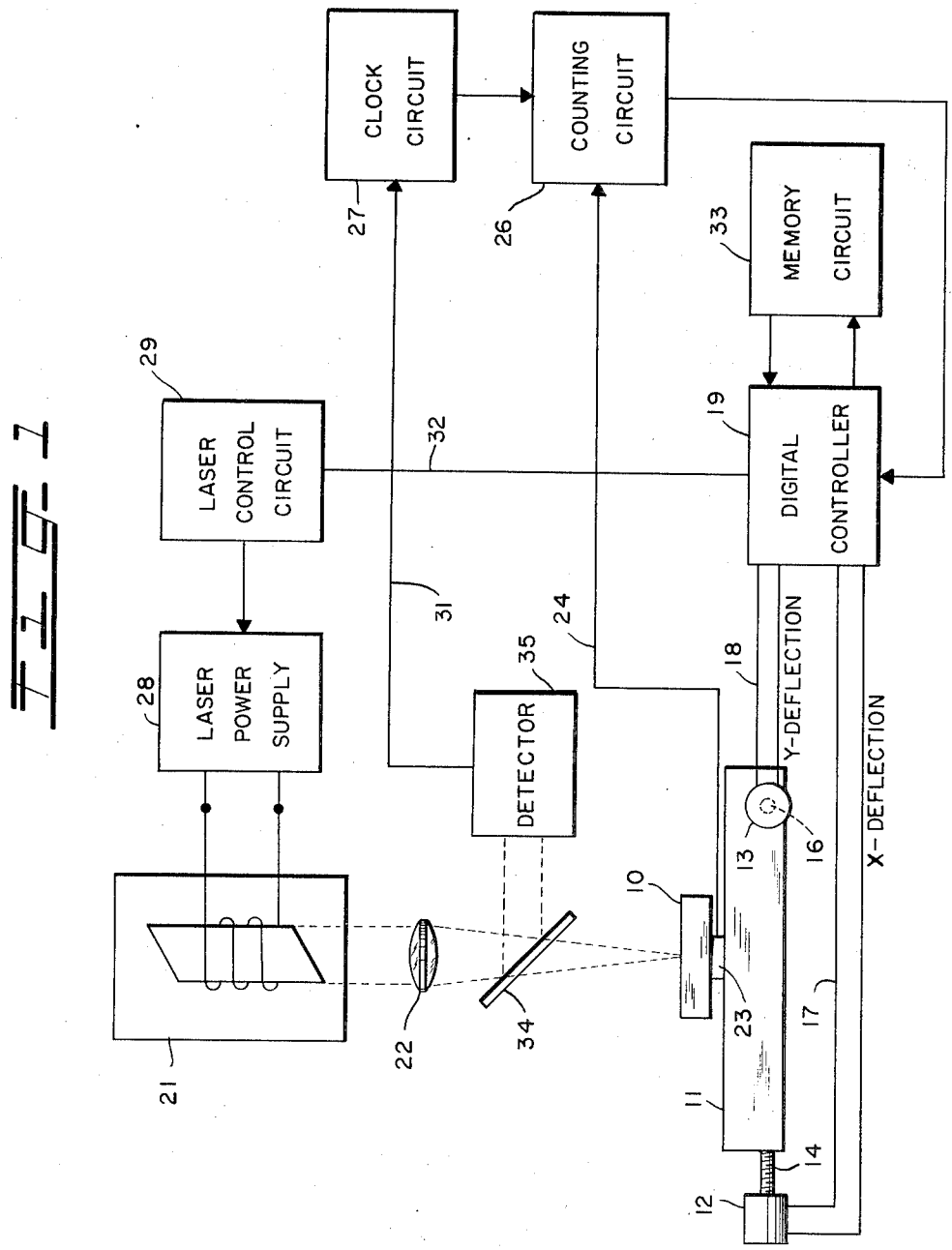
FIG. 1 is a partially cross-sectional and partially block schematic drawing of an illustrative apparatus for practicing the invention.

FIG. 1 depicts one illustrative apparatus which may be used to practice the methods of the instant invention. As shown, the workpiece 10 to be machined is placed upon the surface of a numerically controlled table 11 which is adapted for translation along the X and Y axes by means of a pair of motors 12 and 13 and a corresponding pair of worm screws 14 and 16, respectively. Motors 12 and 13 are connected by circuits 17 and 18, respectively, to a digital control circuit 19, known per se in the art. A radiant energy source 21, for example, a pulsed ruby laser, is positioned above workpiece 10. The radiant energy from source 21 is focused by a lens 22 so that the energy therefrom is concentrated on the upper surface of workpiece 10 to effect material removal from the workpiece, by vaporization, in a well-known manner.

It has been observed that when a concentrated, high-energy beam of radiant energy is suddenly applied to a workpiece, the impact of the beam on the workpiece creates a mechanical shock wave in the workpiece, which shock wave is propagated through the workpiece and travels outward from the point of impact of the beam to the extremities of the workpiece. As is also well known, such a shock wave will travel through the workpiece at the bulk sonic velocity of the material from which the workpiece is fabricated. In the case of gold, for example, the shock wave will travel through the workpiece at a velocity of 2,030 meters per second.

Figure 2:
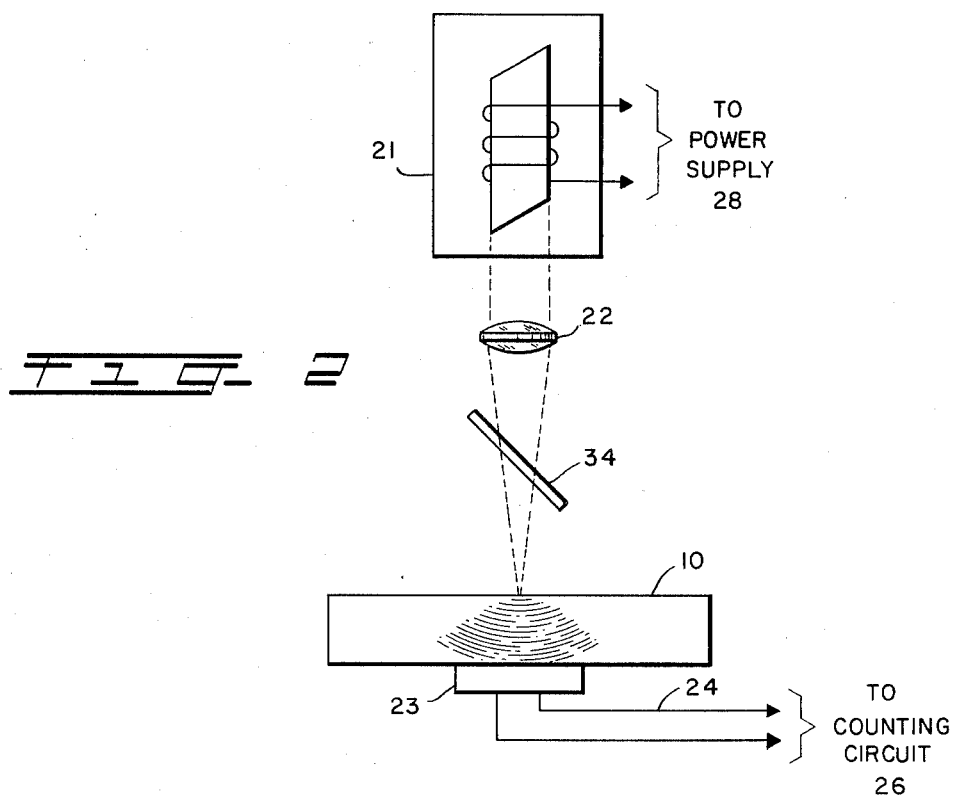
FIG. 2 is a portion of the apparatus depicted in FIG. 1 and shows the generation of shock waves in the workpiece in greater detail.

Referring momentarily to FIG. 2, the manner in which acoustical shock waves are generated in workpiece 10 is illustrated in greater detail. It will be observed that, upon the application of the radiant energy beam to the upper, virgin surface of workpiece 10, an acoustical shock wave is generated in the workpiece which shock wave radiates outwardly therefrom towards the extremities of the workpiece. A sensor 23, which may comprise any of several known acoustic-electrical transducers, for example, a piezo-electric quartz crystal, is positioned on a surface of the workpiece advantageously, the surface opposite from the one upon which the radiant energy beam impinges. Further, to maximize signal pickup, sensor 23 is advantageously located directly opposite the point of impact of the beam. It will be appreciated, however, that sensor 23 could equally well be positioned on another surface of the workpiece or even on the upper surface thereof. However, locations other than that directly opposite the point of application of the beam subject the apparatus to the possibility of error caused by reflected acoustical waves in the workpiece, as will be more fully explained below.

Figure 3:
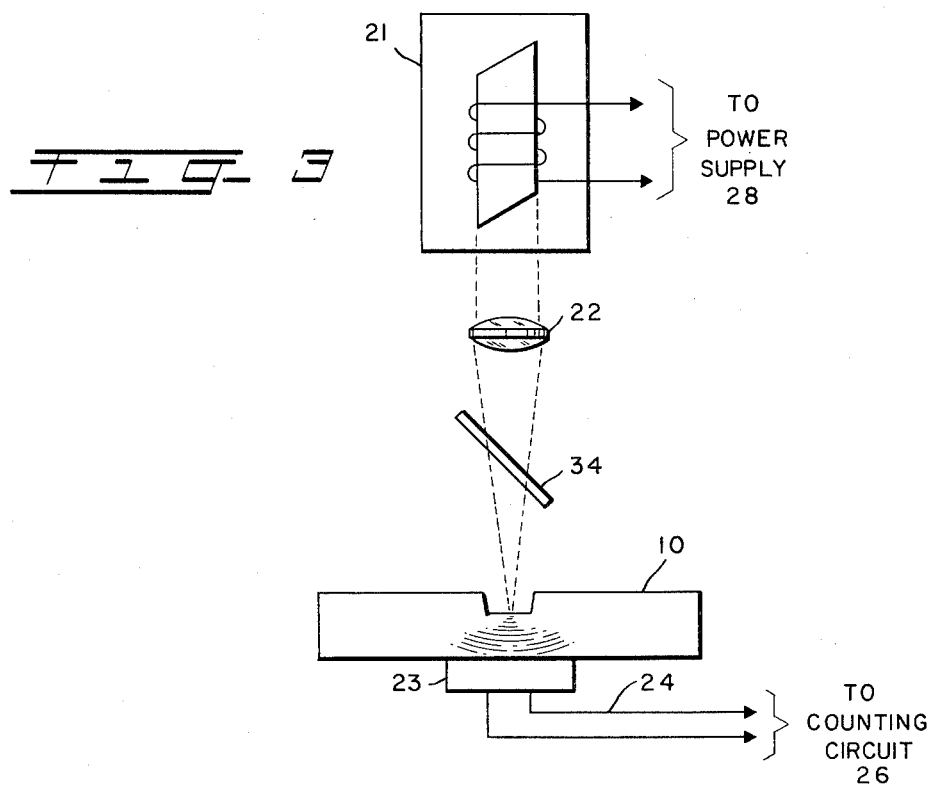
FIG. 3 is another view of the apparatus shown in FIG. 2 and depicts the situation existing after radiant energy has been applied to the workpiece to effect material removal therefrom.

FIG. 3 depicts the apparatus shown in FIG. 2 after several energizations of laser 21 have occurred. It will be observed that a considerable amount of material has been removed from workpiece 10 and that the radiant energy beam now impinges on a portion of the workpiece which is considerably closer to sensor 23 than the upper surface of the workpiece.

Since the physical distance between the point of impact of the beam and the sensor is reduced, it follows that the time required for the acoustical shock wave to travel between those points is proportionally reduced, and it is upon this fact that the instant invention relies.

Returning now to FIG. 1, the time required for each shock wave generated by successive applications of the beam to travel from the point of impact of the beam, through the workpiece, to the opposite face thereof, may be used to monitor the amount of material remaining beneath the point of impact of the beam, and hence, the amount of material which has been removed from the workpiece by the beam. To that end, and as previously discussed, the apparatus shown in FIG. 1 includes a sensor 23 affixed to, or in intimate contact with, workpiece 10 at a position generally opposite the point of impact of the beam and on the opposite surface of the workpiece. Sensor 23 is connected via a circuit 24 to one input of a counting circuit 26. The output of a clock circuit 27 provides the other input for counting circuit 26. Laser 21 is energized by a power supply 28 of appropriate voltage and current, which, in turn, is connected to, and controlled by, a control circuit 29. An optical beam splitter 34, for example, a dichroid mirror or a prism, is positioned in the optical path of source 21 so that a portion of the energy from source 21 is intercepted and projected onto a detector 35. A circuit 31 connects detector 35 to the input of clock circuit 27 so that each time the laser beam is detected by detector 35, clock circuit 27 supplies a starting pulse to counting circuit 26. Digital controller 19 is also connected, via a circuit 32, to laser control circuit 29. A program storage circuit 33, which may comprise, for example, either a conventional magnetic tape, core, or disc circuit, or a punched card or paper tape reading device, is connected to digital controller 19 to control the deflection of table 11 along the X and Y axes, in accordance with the shape that it is desired that the workpiece ultimately attain.

In operation, sensor 23 is affixed to workpiece 10, and workpiece 10 mounted, by any suitable means, not shown, to numerically controlled table 11. The program stored in memory circuit 33 then directs digital controller 19 to energize motors 12 and 13 to move table 11, with respect to the output from laser 21, so that the first portion of workpiece 10 to be machined falls beneath the focus of lens 22. Controller 19 then directs laser control circuit 29, via circuit 32, to condition laser power supply 28. Power supply 28, in turn, applies a potential of sufficient magnitude to laser 21 to cause lasing action therein; and a burst of radiant energy from laser 21 is focused by lens 22 onto the surface of workpiece 10, causing material removal therefrom in a well-known manner.

As previously discussed, the application of the focused beam of radiant energy to the upper surface of the workpiece creates a shock wave within the workpiece. A small portion of the energy from the laser beam is deflected to the laser beam detector 35 and the output of the detector 35 is fed over circuit 31 as a starting pulse for clock circuit 27, which then provides a first clock pulse to counting circuit 26. Counting circuit 26 continues to receive clock pulses from clock circuit 27 and these pulses increase the count stored therein until the shock wave generated by the application of the radiant energy beam to the workpiece arrives at sensor 23. When this shock wave arrives at sensor 23 it produces an electrical signal thereacross, which signal is fed over lead 24 to counting circuit 26 to inhibit the further counting of clock pulses from clock circuit 27. A signal representative of the number of clock pulses stored in counting circuit 26 is fed over a lead to digital controller 19.

As previously discussed, the number of pulses stored by counting circuit 26 is inversely proportional to the amount of material removed from workpiece 10 by the radiant energy beam from laser 21. The amount of material which it is desired to remove from the first position of workpiece 10 is, of course, one of the parameters stored in memory circuit 33. Thus, digital controller 19 compares the signal from counting circuit 26 with the signal stored in memory circuit 33 and if, as will generally be the case, the comparison indicates that not enough material has yet been removed from workpiece 10, controller 19 again signals laser control circuit 29, via lead 32, to energize laser 21 a second time.

The above-described process is reiterated until digital controller 19 indicates that the count stored in counting circuit 26 corresponds to the predetermined count in memory circuit 33 for the first location, and is thus indicative of the fact that the desired amount of material has now been removed from workpiece 10. The program stored in memory circuit 33 then directs digital controller 19 to energize motors 12 and 13, to advance workpiece 10 to a second position and counting circuit 26 reset to zero by any of several known means (not shown). The steps outlined above are then repeated until the entire workpiece has been machined to the desired configuration. It will, of course, be appreciated that different amounts of material will, in general, be removed from different positions of the workpiece, however, since this factor is stored in the program of memory circuit 33, the comparison made in digital controller 19 will be the appropriate one for each position of the workpiece 10 being machined.

Because the bulk sonic velocity of workpiece 10 is substantially lower than the velocity of the electrical signals generated by the laser beam detector 35, the time delay between the application of the start pulse to circuit 31 and the actual time of arrival of the radiant energy beam at the upper surface of workpiece 10 may be safely ignored. Thus, when the acoustical wave arrives at sensor 23 and generates an electrical signal therein, the count in counting circuit 26 is substantially proportional to the amount of material lying between the point of impact of the radiant energy beam and the sensor and is thus inversely proportional to the amount of material which has been removed.

Figure 4:
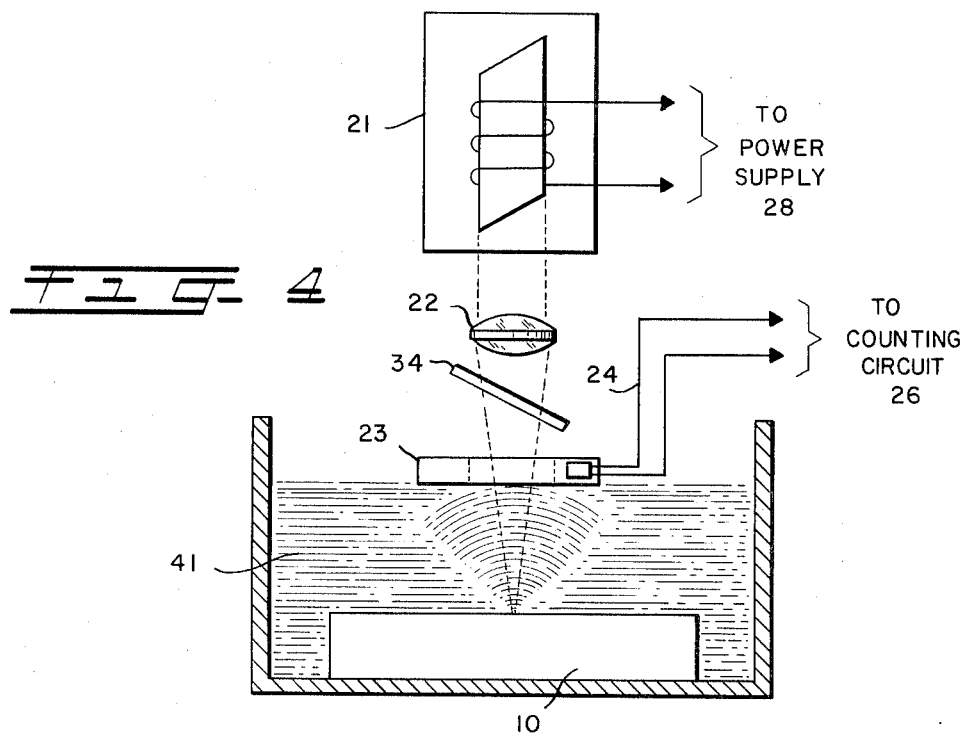
FIG. 4 is a cross-sectional view of an alternative embodiment of the invention in which the workpiece to be machined is immersed in an inert, transparent fluid.

FIG. 4 shows an alternative embodiment of the invention in which workpiece 10 is immersed in a transparent, inert fluid 41 which is contained within a suitable tank 42. In this embodiment of the invention, an annular sensor 43 is positioned in contact with the upper surface of fluid 41 in tank 42 and the radiant energy from laser 21 is directed onto the surface of workpiece 10 through the central aperture of annular sensor 42 and the fluid.

As an alternative to the use of an annular-shaped sensor 43, a transparent sensor, for example, a piezoelectric crystal having semi-transparent electrodes thereon or conventional electrodes lying outside the optical path, may be employed. In either event, the impact of the energy beam from laser 21 onto the upper surface of workpiece 10 effects material removed therefrom, as before, and, in addition, creates a shock wave in the material of workpiece 10, which shock wave is transmitted into the fluid 41 and radiated upwardly to impinge upon sensor 23. The corresponding electrical signal which is generated in sensor 23 is connected, via circuit 24, to counting circuit 26, as before. The remainder of the apparatus used with the embodiment illustrated in FIG. 4 is identical to that shown in FIG. 1.

In the embodiment of the invention shown in FIG. 4, it will be apparent that, as the machining of workpiece 10 continues and more and more material is removed therefrom, the time taken for the acoustical shock wave to travel from the point of impact to the sensor will increase rather than decrease. It is, however, a relatively simple matter to modify controller 19 so that the appropriate comparison is made and further energization of laser 21 terminated when the time interval required for the sonic wave to traverse the distance from the workpiece to the sensor becomes larger than some predetermined value. There are several suitable inert, transparent fluids which may be used for fluid 41. Among them are tetrafluorethylene and de-ionized water. A gaseous fluid may also be used, but the detection of the acoustic shock wave then becomes more difficult.

Figure 5:
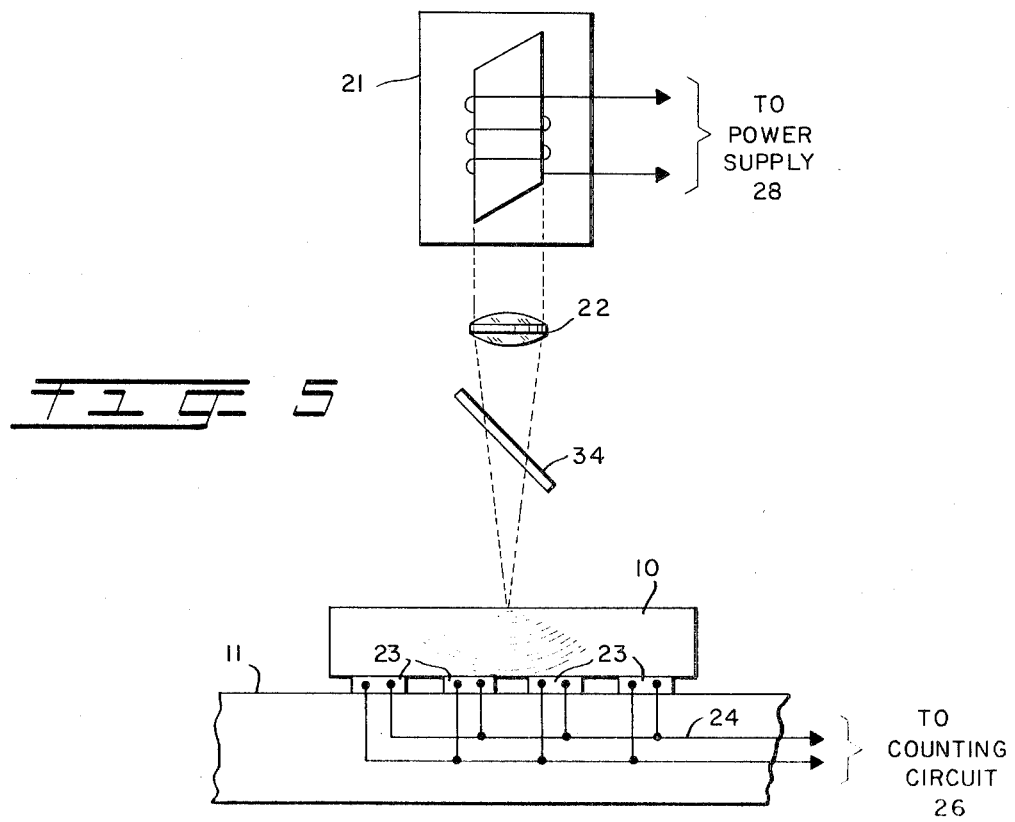
FIG. 5 is a cross-sectional view of an alternative arrangement for connecting sensors to the workpiece to detect the acoustical shock waves generated therein.

FIG. 5 depicts an alternative arrangement for detecting the acoustical shock wave generated in the workpiece. As shown, a plurality of sensors 23 are disposed along the length of workpiece 10. This arrangement is advantageous if workpiece 10 is of any substantial size and ensures that the direct path of the acoustical shock wave is the one which terminates the count on counting circuit 26, rather than some reflected wave. As previously mentioned, detection of a reflected wave in lieu of, or in addition to, the main wave will cause an erroneous indication that the desired amount of material has been removed from the workpiece. In the embodiment shown in FIG. 5, the electrical outputs of all the sensors are connected in parallel and thence connected to the input of counting circuit 26. In this embodiment, and the previously discussed embodiments, counting circuit 26, clock circuit 27, digital controller 19, memory circuit 33, laser power supply 28 and laser control circuit 29 may be any suitable circuit capable of performing the desired function.

The invention has been disclosed with reference to a pulsed laser beam; however, it will be apparent to one skilled in the art that the invention is equally suited for use with other forms of radiant energy; for example, an electron beam or radiant energy from a continuous wave laser shuttered by some suitable mechanical means, not shown. It will also be appreciated that one skilled in the art may make various changes and substitutions in the apparatus shown herein without departing from the spirit and scope of the invention.

What is claimed is:

1. A method of removing a predetermined amount of material from a workpiece, comprising the steps of:
    applying a beam of radiant energy to said workpiece to effect material removal therefrom, the impingement of said beam generating an acoustical shock wave in said workpiece;
    measuring the time interval required for said shock wave to traverse said workpiece from the point of impact of said beam to a sensor positioned proximate said workpiece; and
    repeating the application of said beam to said workpiece until said time interval corresponds to some predetermined value indicative of the fact that said predetermined amount of material has been removed from said workpiece.

2. The method according to claim 1, wherein said sensor generates a first electrical signal when said shock wave impinges thereon, and said measuring step further comprises:
    enabling the operation of a digital clock circuit upon application of said radiant energy beam to said workpiece, said clock circuit generating a continuous train of clock pulse when so enabled;
    counting said train of pulses in a digital counter connected to said clock circuit; and
    terminating the count in said counter upon receipt of said first electrical signal, the count stored in said counter being proportional to said time interval.

3. The method according to claim 2, wherein said repeating step comprises:
    after each application of said beam to said workpiece, comparing the count stored in said counter with a predetermined count; and
    terminating the application of said beam to said workpiece when said count equals said predetermined count.

4. The method according to claim 2, wherein said enabling step further comprises:
directing at least a portion of said radiant energy beam onto a radiation detector to generate a second electrical signal; and
applying said second electrical signal as an enabling pulse to said digital clock circuit.

5. The method according to claim 4, wherein said directing step comprises:
inserting a beam-spitting device at least partially into the path of said radiant energy beam; and
positioning said radiation detector proximate one output of said beam-splitting device.

6. The method according to claim 1, wherein said beam applying step comprises:
applying a laser beam to said workpiece to effect material removal therefrom, the impingement of said laser beam generating an acoustical shock wave in said workpiece.

7. The method according to claim 1, wherein said beam applying step comprises:
applying an electron beam to said workpiece to effect material removal therefrom, the impingement of said electron beam generating an acoustical shock wave in said workpiece.

8. A method of removing a predetermined amount of material from a workpiece comprising the steps of:
immersing said workpiece in a medium transparent to radiant energy;
applying a beam of radiant energy through said medium onto said workpiece to effect material removal therefrom, the impingement of said beam generating an acoustical shock wave in said workpiece, which shock wave is transmitted into said medium;
measuring the time interval required for said shock wave to travel in said medium from the point of impact of said beam to a sensor positioned proximate the surface of said medium; and
intermittently repeating the application of said beam to said workpiece until said time interval reaches some predetermined value, indicative of the fact that said predetermined amount of material has been removed from said workpiece.

9. The method according to claim 8 wherein said sensor is annular in shape and said applying step comprises:
directing said beam of radiant energy through the central aperture of said annular-shaped sensor.

10. A method of machining a workpiece to a particular shape by the selective removal of a predetermined amount of material from a plurality of locations on said workpiece comprising the steps of:
positioning at least one acoustical sensor proximate a first surface of said workpiece;
mounting said workpiece with said sensor attached to a numerically controlled table adapted for motion along at least two axes;
energizing said table to advance said workpiece so that a first one of said plurality of locations is positioned beneath a work station;
intermittently energizing a source of a beam of radiant energy positioned proximate said work station so that said beam repetitively impinges upon a second surface of said workpiece to effect material removal therefrom, each impingement of the beam generating a shock wave in the workpiece;
measuring the time interval required for each of said shock waves to travel through the workpiece from the point of impact of said beam to the location of said sensor; and
advancing said table so that a next one of said plurality of locations is positioned beneath said work station when said measured time interval falls below some predetermined value indicative of the removal of said predetermined amount of material from the first location of said workpiece.

11. Apparatus for removing a predetermined amount of material from a workpiece, which comprises;
a source of radiant energy,
means for supporting said workpiece proximate said source of radiant energy,
means for directing a beam of radiant energy from said source onto said workpiece,
a sensor located proximate a first surface of said workpiece to detect the arrival of acoustical shock waves generated in said workpiece by the impact of said beam on a second surface of said workpiece, and
means responsive to the time interval required for said shock waves to traverse said workpiece for terminating the application of said radiant energy to said workpiece.

12. Apparatus according to claim 11, wherein said terminating means comprises:
a digital clock circuit for generating a train of clock pulses;
means, connected to said clock circuit, for enabling operation thereof when radiant energy from said source is applied to said workpiece;
a digital counter, connected to said clock circuit, for counting said train of pulse; and
means, connected to said counter, for discontinuing the operation of said radiant energy source.

13. The apparatus according to claim 12, wherein said discontinuing means comprises:
a digital controller, connected to said digital counter, for comparing the count in said counter with a predetermined count; and
means, connected to said digital controller, for deactivating said radiant energy source when the count in said counter equals said predetermined count.

14. The apparatus according to claim 12, wherein said enabling means comprises:
a radiation detector; and
means for directing at least a portion of said radiant energy onto said radiation detector.

15. The apparatus according to claim 14, wherein said energy directing means comprises a beam-splitting device at least partially inserted into the path of the radiant energy from said radiant energy source.

16. The apparatus according to claim 11, wherein said source of radiant energy comprises a laser.

17. The apparatus according to claim 11, wherein said source of radiant energy comprises an electron-beam device.

18. Apparatus for removing a predetermined amount of material from a workpiece, which comprises:
a source of radiant energy;
a tank containing a medium transparent to said radiant energy, into which said workpiece is immersed;
means for directing a beam of radiant energy from said source onto said workpiece to effect material removal therefrom, each impingement of said beam generating an acoustical shock wave in said workpiece;

an annular-shaped sensor, positioned proximate the upper surface of said medium, and coaxial with said beam of radiant energy, to detect said shock wave; and means for measuring the time interval required for said shock wave to traverse the distance between the point of impact of said beam of radiant energy on said workpiece and the location of said annular-shaped sensor, to terminate application of the beam of radiant energy to said workpiece.

19. Apparatus for machining a workpiece to a particular shape by the selective removal of predetermined amounts of material from a plurality of locations on said workpiece, which comprises:

a source of radiant energy;

control means connected to said source for controlling the generation of said radiant energy;

means for directing a beam of said radiant energy onto a point of application on said workpiece;

numerically controlled means for imparting motion to said workpiece along at least two axes to position a first one of said plurality of locations proximate the point of application of said beam;

at least one sensor positioned adjacent said workpiece to detect acoustical shock waves generated in said workpiece by the impact of said beam thereon;

counting means connected to said sensor and to said control means for measuring the time interval required for said shock waves to traverse said workpiece; and means responsive to the count stored in said counting means for terminating the application of radiant energy to said first location, and for causing said numerically controlled means to position a second one of said locations proximate the point of application of said beam.

* * * * *